United States Patent
Pellenc

(10) Patent No.: US 10,098,284 B2
(45) Date of Patent: Oct. 16, 2018

(54) HAND-HELD POWER TOOL WITH PROTECTED TRANSMISSION

(71) Applicant: PELLENC (Societe Anonyme), Pertuis (FR)

(72) Inventor: Roger Pellenc, Pertuis (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 15 days.

(21) Appl. No.: 15/513,296

(22) PCT Filed: Nov. 3, 2015

(86) PCT No.: PCT/FR2015/052966
§ 371 (c)(1),
(2) Date: Mar. 22, 2017

(87) PCT Pub. No.: WO2016/083696
PCT Pub. Date: Jun. 2, 2016

(65) Prior Publication Data
US 2017/0238472 A1    Aug. 24, 2017

(30) Foreign Application Priority Data

Nov. 25, 2014 (FR) ...................... 14 61406

(51) Int. Cl.
*A01G 3/037* (2006.01)
*F16H 25/22* (2006.01)
*F16H 25/20* (2006.01)

(52) U.S. Cl.
CPC ......... *A01G 3/037* (2013.01); *F16H 25/2204* (2013.01); *F16H 2025/2031* (2013.01);
(Continued)

(58) Field of Classification Search
CPC ............... A01G 3/037; F16H 25/2204; F16H 2025/2043; F16H 2025/2031; F16H 2025/2078
See application file for complete search history.

(56) References Cited

U.S. PATENT DOCUMENTS

| | | | | |
|---|---|---|---|---|
| 4,644,811 A | * | 2/1987 | Tervo | ................... F16H 25/2015 |
| | | | | 187/267 |
| 4,679,485 A | * | 7/1987 | Nelson | .................... B64C 13/42 |
| | | | | 74/424.71 |

(Continued)

FOREIGN PATENT DOCUMENTS

| | | |
|---|---|---|
| EP | 2682238 A1 | 1/2014 |
| WO | 2013011230 A1 | 1/2013 |
| WO | 2013164310 A1 | 11/2013 |

OTHER PUBLICATIONS

International Search Report for corresponding International Application No. PCT/FR2015/052966.

*Primary Examiner* — Sean Michalski
(74) *Attorney, Agent, or Firm* — Egbert Law Offices, PLLC

(57) ABSTRACT

A hand-held power tool having a motor, a cutting member and a transmission linking the cutting member to the motor, the motor and the transmission being housed in a main housing, the transmission having a ball screw/nut mechanism with a screw and a nut, one of the screw and the nut being rotatably engaged with the motor, and the other of the screw and the nut being linked to the cutting member. The tool has a protective housing for protecting the ball screw/ nut mechanism, separate from the main housing, and a sliding seal cooperating with an inner face of the protective housing, the sliding seal being driven by one of the nut and the screw linked to the cutting member, the sliding seal (Continued)

being rigidly connected respectively to one of a sleeve covering the nut and a cap protecting the screw.

14 Claims, 2 Drawing Sheets

(52) U.S. Cl.
CPC .............. *F16H 2025/2043* (2013.01); *F16H 2025/2078* (2013.01)

(56) References Cited

U.S. PATENT DOCUMENTS

| | | | | |
|---|---|---|---|---|
| 5,906,136 | A * | 5/1999 | Yabe | F16C 33/3713 |
| | | | | 277/562 |
| 9,521,810 | B2 * | 12/2016 | Zurcher | A01G 3/037 |
| 2005/0087029 | A1 * | 4/2005 | Perni | F16H 25/2418 |
| | | | | 74/89.4 |
| 2008/0257080 | A1 * | 10/2008 | Singh | F16H 25/20 |
| | | | | 74/89.23 |
| 2015/0121706 | A1 * | 5/2015 | Zurcher | A01G 3/037 |
| | | | | 30/228 |
| 2015/0329138 | A1 * | 11/2015 | Peterreins | B62D 5/0448 |
| | | | | 74/424.75 |
| 2017/0096165 | A1 * | 4/2017 | Bae | B62D 5/0424 |
| 2017/0238472 | A1 * | 8/2017 | Pellenc | A01G 3/037 |
| 2017/0241525 | A1 * | 8/2017 | Pellenc | A01G 3/037 |
| 2018/0043927 | A1 * | 2/2018 | Asakura | F16H 25/2204 |
| 2018/0058554 | A1 * | 3/2018 | Huebner | F16H 25/2056 |

* cited by examiner

HAND-HELD POWER TOOL WITH PROTECTED TRANSMISSION

TECHNICAL FIELD

The present invention concerns a hand-held power tool and in particular a pruning shear usable for cutting and harvesting work, especially pruning of vines and fruit trees. In a more general way, the invention can also find applications with tools including a linear displacement actuator with a ball screw-nut mechanism. A ball screw-nut mechanism is understood to be a mechanism capable of transforming, with a minimum of energy loss, the rotary movement of a motor, and in particular an electric motor, into a translational motion.

STATE OF PRIOR ART

The state of the art is described in reference to electric pruning shears. The technical problems encountered in the state of the art are however not limited to pruning shears and may be encountered on other comparable tools such as plate shears, for example.

The electric pruning shears present a general structure with a motor, a cutting member and a transmission connecting the motor to the cutting member. The term "transmission" designates here the assembly of parts which transmit the movement of the motor to the cutting member. The transmission may notably include a gear mounted on the output shaft of the motor, and a ball screw-nut mechanism driven by the gear. The ball screw-nut mechanism consists of a screw and a nut which mutually cooperate through the intermediary of balls circulating in a ball raceway. The ball raceway is formed by complementary threads of the nut and the screw. The rotary movement of the screw results in a translation of the nut along the screw and parallel to the axis of the screw. The direction of movement of the nut depends on the sense of rotation of the screw.

The translational motion of the nut is used to drive the cutting member. In the case of a pruning shear, the cutting member generally includes a fixed blade and a mobile blade. The mobile blade is mounted on a pivot and so can pivot between an open position and a closed position on the fixed blade. The transmission includes for this purpose rocker bars which connect the mobile blade to the nut of the ball screw-nut mechanism cited above.

The motor and the transmission are housed in a main casing which, in the case of pruning shears, also serves as the handgrip. Now, since the casing serves as handgrip, the dimensioning of internal components, in particular of the motor and the transmission, must be adapted, and preferably reduced, to ensure comfortable handling of the tool.

The cutting member, and in particular the blades are mounted in front of the main casing. The fixed blade and the pivot of the mobile blade are usually screwed to the main casing.

The overall shape of the casing next to the cutting member is configured to protect the internal components of the casing in the best way possible. It is especially configured to protect the transmission from dust and debris generated by the cutting operations. It is however difficult to adjust the main casing exactly to the blades of the cutting member so as not to obstruct their movement. It is also noticed that debris, sand or dust gradually contaminate the transmission members. In particular, debris, sand or dust can come into contact with the lubricant of the ball screw-nut mechanism and bind especially to the lubricant of the mechanism. The debris, sand or cutting dust are liable to be driven into the raceway of the balls and to cause its rapid wear or even the blockage of the ball screw-nut mechanism. Another risk is that the balls might spill from a ball recycling system provided in the nut.

From the document WO2013/154310 a pruning shear is known that is equipped with a guide system with a guide ring integral with the screw nut. The guide ring slides inside the tool body which is cylindrical, so as to relieve the transmission of lateral stress. The guide ring is advantageously used to clean the internal surface of the tool body. Such a configuration protects, at least partially, the transmission from debris and cutting dust. It requires however a precise fit of the tool body, i.e. of the main casing to the guide ring over the entire path covered by the latter.

DISCLOSURE OF THE INVENTION

It is the aim of the present invention to provide in a simple manner absolute protection of the transmission of hand-held power tools against debris and cutting dust.

Another aim is to provide a kind of protection that does not make use of the tool body and which does not require any particular conformation of its casing.

One more aim is to propose such a protection that can be verified and tested before assembling the tool and in particular before mounting the sub-assembly consisting of the motor and the transmission in the tool casing.

Therefore, the invention proposes a hand-held power tool including a motor, a cutting member and a transmission linking the cutting member to the motor, the motor and the transmission being housed in a main casing, the transmission including a ball screw-nut mechanism in which one of the screw and the nut is integral with the rotation of the motor and the other one of the screw and the nut is connected to the cutting member. In accordance with the invention the tool also includes a protective casing of the ball screw-nut mechanism, separate from the main casing, and a sliding seal cooperating with an internal face of the protective casing, the sliding seal being driven by either the nut or the screw linked to the cutting member. Depending on whether it is driven by the nut or the screw, the sliding seal is integral with either a sleeve covering the nut or a protective screw cap.

The protective casing, associated with the sliding seal, forms a sealed space and protects the screw from any possible dirt intrusion. Therefore, the impermeability of the seal is understood to be impermeability with respect to soiling such as dust, cutting debris or sand corns likely to rapidly and progressively degrade the functioning of the ball screw-nut mechanism. The protective casing also protects the nut and the raceway of the balls. It may present a cross-section that is preferably circular, oval or oblong.

The fact that the seal is driven by the portion of the ball screw-nut mechanism that is linked to the cutting member, i.e. the portion moving in translation, allows the seal to accompany the movement without breaking its tightness.

As mentioned before, the protective casing is separate from the main casing of the tool. This characteristic is advantageous in more than one respect.

First of all, it allows conforming and sizing the protective casing in an optimal manner relative to the ball screw-nut mechanism, and in particular relative to the seal. In effect, this conformance can be achieved independently from that of the main casing, i.e. from the tool body.

This measure is particularly interesting not only for the manufacture of the protective casing but also, and above all, for the manufacture of the main casing. The shape of the main casing is not dependent on a possible function of protection against dust and can be determined in response to other requirements, especially when the tool body serves as the gripping handle.

The shape of the main casing in particular can be designed to make an opening for venting, a technical access for cleaning by blow-out or the passage of wires without interfering with the transmission. The main casing simply presents any shape that is adapted to the support and retention of the ball screw-nut mechanism. This makes it possible to produce it by simple molding, without any further machining, for accepting the mechanism and especially the protective casing.

Finally, use of a protective casing that is separate from the main casing makes it possible to protect the screw beginning at the time of assembly of a sub-assembly consisting of the motor and the transmission and before the integration of this sub-assembly in the main casing. This particularity notably enables a functional control of this sub-assembly prior to installation in the main casing by limiting the risks of incorporating any foreign matter in the ball screw during this step in the manufacture.

The protective casing can be configured to be fitted in the main casing in a removable manner. This allows protecting the screw and the nut in case the tool needs to be dismantled for example for maintenance or cleaning purposes.

In order to transform the rotary movement of the motor into a motion of translation, one of the screw and the nut is connected to the motor, and if applicable, to a gear associated with the motor, and is driven in rotation. The counterpart of either the screw or the nut which is now powered by a translation movement is connected to the cutting member.

In a particular implementation of the invention, the screw is driven in rotation by the motor or the gear and the screw is connected to the cutting member. The screw may be integral with the motor shaft or mounted on the gear. In this case, the nut, which is connected to the cutting member is provided with the sliding seal in the protective casing. The seal is integral with a sleeve capping the nut. The sleeve may extend, for example, over a face of the nut that is perpendicular to the axis of the screw and preferably turned towards the interior of the protective casing. The sleeve may also extend over all or part of the exterior surface of the nut, parallel to the axis of the screw. The seal is, for example, a lip seal with a lip attached to the sleeve or being of one piece with the sleeve.

In other respects, and to complete the protection of the transmission and especially to protect one face of the ball nut turned away from the motor, this face can be provided with a protective bushing. The protective bushing is able to protect a portion of the screw which extends over the nut when the nut moves along the screw. It is also able to protect the face of the nut turned away from the motor and which is not surrounded by the protective housing. In this way, the bushing prevents debris or dust from penetrating into the ball raceway from this side. The protective bushing is rigidly mounted on the nut and presents a diameter preferably matching that of the screw. The diameter may be chosen slightly greater than that of the screw to avoid any friction. The rigid assembly of the bushing on the nut makes it possible to ensure concentricity of the bushing with respect to the screw and thus to maintain a reduced play with the screw without creating any friction.

The length of the protective bushing is preferably adapted to the length of the screw portion likely to stick out from the nut when the nut is at the end of its course in the direction of the motor.

The bushing can be designed to extend partially into the nut, thereby efficiently protecting the ball raceway. Just like the protective casing, the bushing may be made of metal, plastic material or a composite material.

The bushing can be provided with at least one vent. The vent is particularly useful when the diameter of the bushing matches that of the screw. It serves in effect to prevent a temporary low or excess pressure in the bushing following a rapid movement of the nut.

Rocker bars of the transmission or an equivalent mechanism connect the nut to the cutting member. They are preferably positioned on both sides of the bushing.

In another mode of implementation of the invention, the nut is mounted on the motor shaft or on the reduction gear output so as to be driven in rotation. The screw, which is then moved in a translational motion, is connected to the cutting member by one or several rocker bars or an equivalent mechanism. In this case the sliding seal is integral with the screw and preferably with a protective screw cover capable of sliding between the nut and the protective casing. The seal may feature a lip mounted, for example, in proximity of an end of the cover turned towards the motor. The lip may also be formed of a single piece with the cover.

The protective cover preferably presents a circular section adapted to the equally circular nut. It is fastened at the free end of the screw, i.e. the end connected to the cutting member. The previously mentioned rocker bars may be mounted on the cover or directly on the screw.

Other characteristics and advantages of the invention will become clear from the following descriptions in reference to the drawings of the figures. This description is given for illustrative purposes and not limiting.

DETAILED DESCRIPTION OF THE MODES OF IMPLEMENTATION OF THE INVENTION

In the following description, identical or similar parts of the various figures are marked with the same reference marks so they can be referred to more easily from on figure to another.

Figures 1, 2:
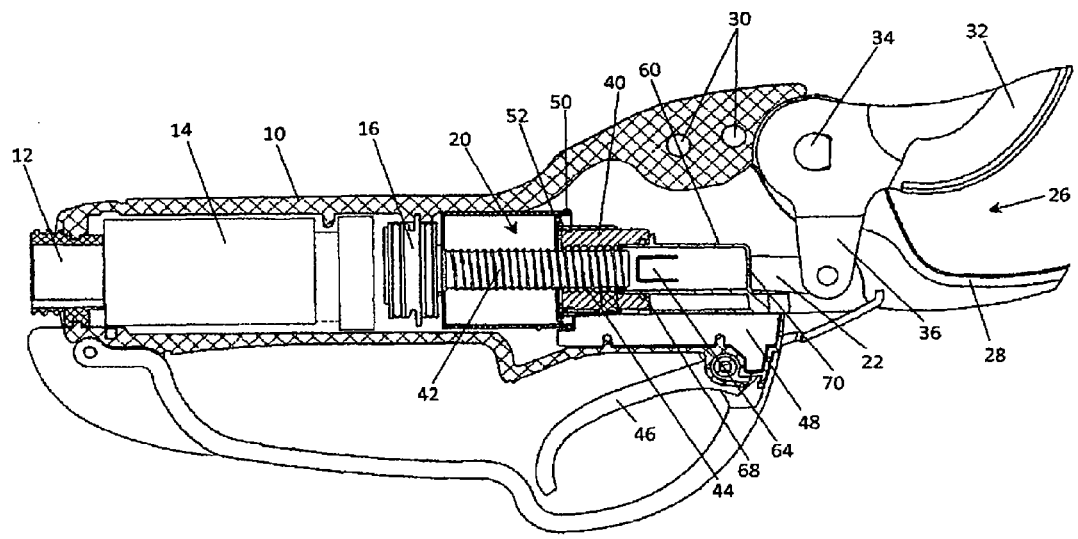
FIG. 1 is a longitudinal section of an electric pruning shear in accordance with the invention, with a cutting member in open position.
FIG. 2 is a partial section of the pruning shear of FIG. 1, in closed position of the cutting member (not shown), along a cutting plane passing through the screw of the ball screw-nut mechanism, and perpendicular to the cutting plane of FIG. 1.

FIG. 1 shows a hand-held power tool and more precisely a pruning shear in accordance with the invention. It is useful to specify that the pruning shear of FIG. 1 is an electric pruning shear with remote power supply. The remote power supply includes a battery of accumulators the user can carry on his belt or on his back and which is connected to the pruning shear by a supply cable. The supply cable and the supply battery do not appear in the figures for the sake of simplification.

The pruning shear includes a main casing 10 in which are housed, in this order, a connector 12 to connect the pruning shear to its power supply, a rotary electric motor 14, a reducing gear 16 mounted on the motor shaft, a ball screw-nut mechanism 20, and rocker bars 22.

The rocker bars 22, the ball screw-nut mechanism 20 and the gear are part of the transmission of the pruning shear. The transmission is in fact included as the assembly of elements which communicate the movement of the motor to the cutting member 26.

The cutting member 26 includes a blade 28, set and rigidly fixed to the casing by means of screws 30. It also includes a mobile blade 32, connected to the casing though the intermediary of a pivot 34. The mobile blade 32 is provided with a cam 36 connected to the ball screw-nut mechanism 20 through the intermediary of the rocker bars 22. A single rocker bar is visible on FIG. 1.

The rocker bars 22 are more exactly connected to a nut 40 of the ball screw-nut mechanism 20, by an articulation that is not visible on the figure. The nut 40 presents a thread which cooperates with a corresponding thread of a screw 42 through the intermediary of balls. The threads of the nut 40 and of the screw 42 constitute a raceway 44 for the balls which transmit the movement stress from the screw towards the nut. The balls are not shown on the figure. They are kept inside the screw by a recirculation system known as such.

The screw 42 is integral in rotation with the reducing gear 16 and hence with the motor 14. The rotation of the screw 42 drives the displacement of the nut 40 along the screw, parallel to its axis, in a translational movement. The rotation of the screw displaces the nut from an extreme position next to the gear, towards a second extreme position at the free end of the screw. The direction of the movement of the screw between these two extreme positions depends on the sense of rotation of the screw, and hence of the motor.

The movement of the screw 40, from its first extreme position towards its second extreme position makes the mobile blade 32 pivot from its closed position to an open position. The open position is the one shown on the figure.

The command for the displacement of the mobile blade between the open and closed positions takes place by means of a trigger 46 and an electronic control card 48.

The movement of the blade and the cut of vegetation produce debris and dust which, in spite of a tightly fitted configuration of the housing in proximity of the cutting member, eventually accumulate in an internal housing of the casing 10 around the transmission elements and especially around the ball screw-nut mechanism.

In order to prevent the debris and dust from impeding the movement of the ball screw-nut mechanism, the pruning shear of FIG. 1 includes notably a protective casing 50. This casing surrounds the screw 42 along all or part of the travel of the nut 40. The protective casing is preferably cylindrical. It is sized so it can receive the nut, especially during its travel in direction of the reducing gear.

A sliding seal 52 of the nut 40, with a tight lip seal cooperates with the internal face of the protective casing 50 so that no dust or impurity can reach the portion of the screw located inside the protective casing. The protective casing, associated with the lip, also protects the interior face of the nut 40, i.e. the face turned towards the motor. These measures protect also the part of the raceway 44 of the balls arriving in the interior of the protective casing free from dust and dirt.

When the nut moves in the direction of the gear 16, i.e. towards its first extreme position, a portion of the screw 42 exceeds the exterior face of the nut, i.e. the face turned towards the cutting tool 26. In order to also protect the screw 42 in this position of the nut, as well as the external face of the nut, the latter is provided with a protective bushing 60. The protective bushing, like the protective casing, has a function of preserving the screw and the nut from the debris and dust caused by cutting.

The protective bushing 60, better visible on FIG. 2, includes a sleeve 62 which inserts itself partially in the nut 40. The sleeve is held on the nut by tabs 66 mounted on the flexible blades 64 of the bushing 60. The tabs engage in an internal throat 68 of the nut.

It is possible to observe on FIG. 2 that the diameter of the protective bushing 60 matches the diameter of the screw 42. Slight play can be preserved in order to avoid friction of the screw inside the bushing. Friction is also avoided on account of a rigid fastening of the bushing on the nut which keeps the bushing concentric to the screw. The rigid fastening is ensured by the sleeve 62, to be specific.

The protective bushing 60 is provided at its end with a vent 70. The vent makes it possible to prevent a phenomenon of compression and depression in the bushing during the movement of the nut, especially on account of the matched character to the diameter of the screw 42.

FIG. 2 also shows that the lip of the seal 52 of the nut 40 is integral with a sleeve 54 which caps the end of the nut on the side of its internal face. In the example shown, the cover is held on the nut by means of a rib 56 engaged in a throat 58 of the nut. The lip 52 may be made of a single piece with the cover, or added to the cover, as the figure shows. The lip and the cover are preferably made of an elastic plastic material, polymer for example. During the movement of the nut 40, the lip of the seal 52 scrapes the internal face of the protective casing 50 so as to leave it dust-free.

The position of the nut 40 shown in FIG. 2 corresponds to the mobile blade in the closed position. It is possible to observe that, in this extreme position, the nut is totally received in the protective casing. It is also possible to observe that the rocker bars 22 which link the nut to the mobile blade, not shown on FIG. 2, are designed to make a passage for the bushing 60. The rocker bars are linked to the nut 40 through the intermediary of studs 23.

Figure 3:
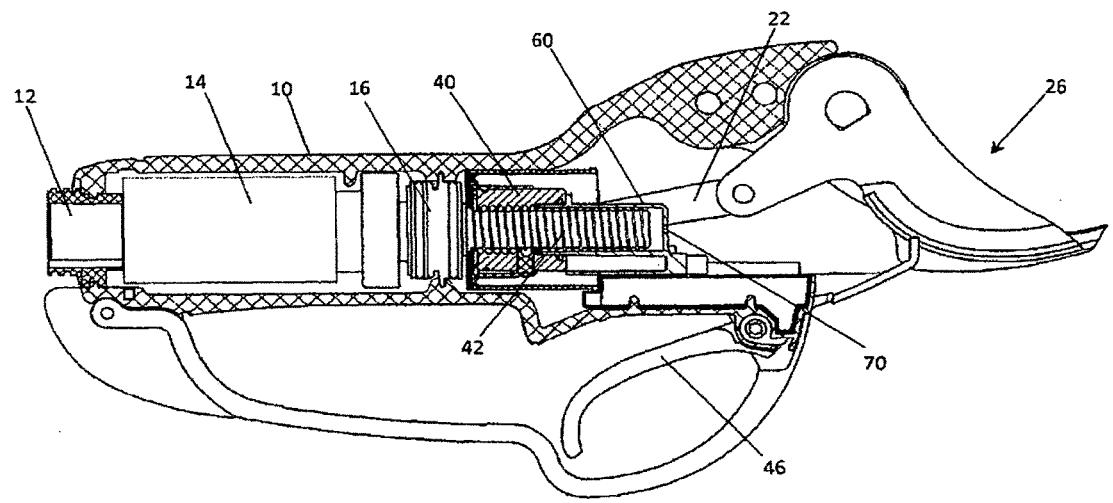
FIG. 3 is a longitudinal section of the pruning shear of FIG. 1 with the cutting member in closed position.

FIG. 3, comparable to FIG. 1 described above, shows the pruning shear with the blade in a closed position. The nut 40 is in its extreme position at the bottom of the protective casing next to the reducing gear 16, and the screw 42 is extended inside the bushing 60.

The length of the bushing is adapted to the portion of the screw which exceeds the nut in this position.

Figure 4:
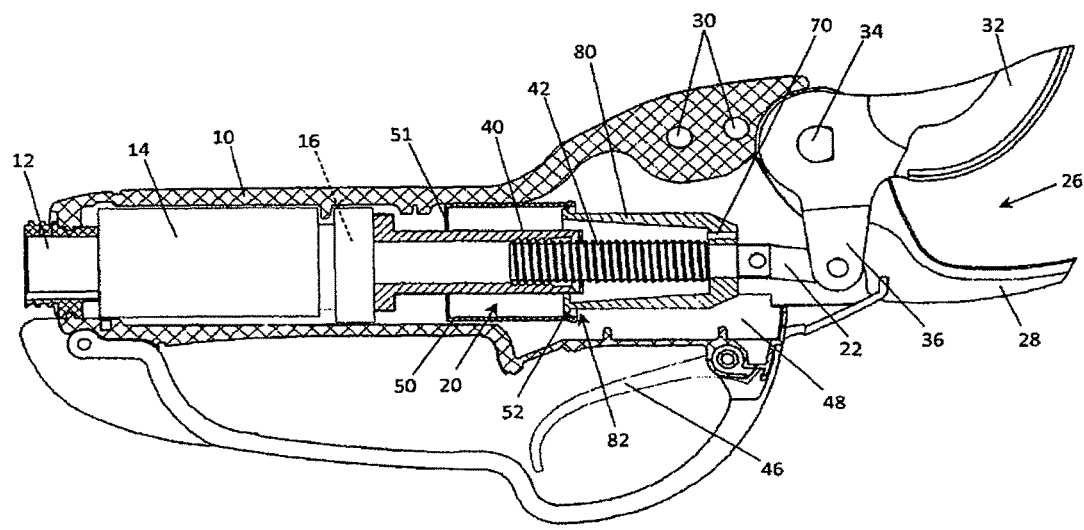
FIG. 4 is a longitudinal section of an electric pruning shear in accordance with the invention according to a variance of implementation of the invention.

FIG. 4 shows another possibility of implementation of the invention in which the nut 40 is directly mounted in rotation on the reducing gear 16 and driven in rotation by the gear. The screw 42, which is not engaged with the motor or the gear does not rotate. It is simply driven in translation under the effect of the rotation of the nut. The end of the screw is linked by rocker bars 22 to the cam 36 of the mobile blade 32. A cylindrical cap 80, also fastened to the end of the screw 42, surrounds the screw and extends as far as the protective casing 50. An end 82 of the cap is provided with a tight seal 52, in the form of a lip which comes into contact with the internal face of the protective casing 50. The inside diameter of the cover can match the outside diameter of the nut 40, especially when the nut is equally cylindrical. However, and preferably, sufficient play is left between the cover 80 and the nut 40 so as to avoid any friction.

One end of the protective casing 50 turned towards the motor can be closed by a fixed wall 51. The wall presents a passage way for the nut 40 and creates adequate play to prevent the casing from rubbing on the rotating nut. A rotating seal may perhaps be provided between the fixed wall 51 of the casing and the nut. The usefulness of such a seal may however be reduced to the extent that the protective casing is received in the main casing and that the fixed wall 51 is not exposed to the debris likely to be coming from the cutting member 26.

In the example of the figure the pruning shear is shown with the pivoting blade 32 in open position. The screw 42 occupies an extremal position in which it extends primarily outside of the nut. The seal 52 then finds itself in proximity to an end of the protective casing 50 turned towards the cutting member 26. Inversely, when the pivoting blade 32 closes on the fixed blade 28, the cover 80 and the seal 52 come closer to the fixed wall 51 of the bottom of the casing 50.

The cover 80 may feature in its end a vent 70. The vent is able to prevent a phenomenon of compression or negative pressure in the bushing during the displacement of the screw 42.

The invention claimed is:

1. Hand-held power tool including a motor, a cutting element and a transmission connecting the cutting element to the motor, the motor and the transmission being housed in a main casing, the transmission including a ball screw-nut mechanism with a screw and a nut, one of the screw and the nut being integral in rotation with the motor, and the other of the screw and the nut being connected to the cutting element, characterized by a protective casing of the ball screw-nut mechanism, separate from the main casing, and by a sliding seal cooperating with an internal face of the protective casing, the sliding seal being driven by one of the nut and the screw connected to the cutting element, the sliding seal being integral, respectively, with one of a cover capping the nut and a protective cover of the screw.

2. Hand-held power tool according to claim 1, in which the screw is integral in rotation with the motor and in which the sliding seal is formed on the cover capping the nut.

3. Hand-held power tool according to claim 1, in which the screw is integral in rotation with the motor and including furthermore a protective bushing of the screw, rigidly mounted on a face of the nut opposite the motor.

4. Hand-held power tool according to claim 3, in which the bushing extends partially into the nut.

5. Hand-held power tool according to claim 3, in which the bushing is provided with a vent.

6. Hand-held power tool according to claim 1, in which the nut is integral in rotation with the motor and in which the seal is integral with the protective cover of the screw, the protective cover being able to slide between the nut and the protective casing.

7. Hand-held power tool according to claim 6, in which the cover is connected to an end of the screw turned towards the cutting member.

8. Hand-held power tool according to claim 1, in which the seal is a lip seal.

9. Hand-held power tool according to claim 1, in which the protective casing presents a cross section that is either cylindrical, oval or oblong.

10. Hand-held power tool according to claim 1, in which the transmission includes a reducing gear mounted on a motor shaft, either the screw or the nut being mounted on the gear, respectively.

11. Hand-held power tool according to claim 10, in which the protective casing is mounted on the reducing gear.

12. Hand-held power tool according to claim 1, in which the protective casing is received in a removable manner in the main casing.

13. Hand-held power tool according to claim 1, including rocker bars connecting either the nut or the screw to a cam of a mobile blade of the cutting member.

14. Hand-held power tool according to claim 1, characterized in that the tool is a pruning shear.

* * * * *